(12) United States Patent
Tomizawa

(10) Patent No.: US 7,386,918 B2
(45) Date of Patent: Jun. 17, 2008

(54) HINGE DEVICE

(75) Inventor: Kenji Tomizawa, Shibayama-machi (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 8 days.

(21) Appl. No.: 10/585,282

(22) PCT Filed: Dec. 27, 2004

(86) PCT No.: PCT/JP2004/019501

§ 371 (c)(1),
(2), (4) Date: Jul. 3, 2006

(87) PCT Pub. No.: WO2005/066508

PCT Pub. Date: Jul. 21, 2005

(65) Prior Publication Data

US 2007/0119022 A1 May 31, 2007

(30) Foreign Application Priority Data

Jan. 9, 2004 (JP) .............................. 2004-003911

(51) Int. Cl.
*E05F 1/08* (2006.01)
(52) U.S. Cl. .......................................... 16/303; 16/330
(58) Field of Classification Search ................. 16/330, 16/303, 334, 336, 307, 308; 379/433.12, 379/433.13; 455/575.3, 575.1, 575.4, 550.1, 455/90.3; 348/333.06, 373, 794; 361/680–683
See application file for complete search history.

(56) References Cited

U.S. PATENT DOCUMENTS 5,109,571 A * 5/1992 Ohshima et al. .............. 16/307

(Continued)

FOREIGN PATENT DOCUMENTS

EP 1 103 688 A2 5/2001

(Continued)

OTHER PUBLICATIONS

International Search Report for PCT/JP2004/019501 dated Apr. 26, 2005 (2 pages).

(Continued)

*Primary Examiner*—Chuck Y. Mah
(74) *Attorney, Agent, or Firm*—Osha Liang LLP

(57) ABSTRACT

A projection part 33 is formed on an end face 32 of a first turnable member 3. A short recess 43 and a long recess 44 are formed in an end face 43 of a second turnable member 4. The short recess 43 is provided at both end parts thereof with lock faces 43a, 43b which are abutted with both end parts of the projection part 33 to prohibit the first and second turnable members 3, 4 from making a relative turn with force of a predetermined magnitude. The long recess 44 is provided at one end part thereof with an inclination surface 44a which is abutted with one end part of the projection part 33 to turn bias the first turnable member in one direction with respect to the second turnable member and at the other end part with an inclination surface 44b which is abutted with the other end part of the projection part 33 to turn bias the first turnable member in the other direction with respect to the second turnable member. The inclination surfaces 44a, 44b are symmetrically arranged with respect to a line passing through a center between the lock faces 43a, 43b and orthogonal to an axis of the second turnable member 4.

1 Claim, 7 Drawing Sheets

U.S. PATENT DOCUMENTS

| | | | | |
|---|---|---|---|---|
| 5,697,124 | A | * 12/1997 | Jung | 16/341 |
| 5,970,819 | A | * 10/1999 | Katoh | 74/531 |
| 6,305,050 | B1 | * 10/2001 | Imai | 16/303 |
| 6,785,936 | B2 | * 9/2004 | Koshikawa | 16/328 |
| 6,832,411 | B2 | * 12/2004 | Koshikawa et al. | 16/330 |
| 7,027,845 | B2 | * 4/2006 | Sudo | 455/575.1 |
| 7,107,649 | B2 | 9/2006 | Nishihara | 16/341 |
| 7,251,859 | B2 | * 8/2007 | Oshima et al. | 16/330 |
| 2004/0181909 | A1 | * 9/2004 | Kawamoto | 16/330 |
| 2005/0044663 | A1 | * 3/2005 | Wu et al. | 16/280 |

FOREIGN PATENT DOCUMENTS

| | | |
|---|---|---|
| JP | 2-180321 | 7/1990 |
| JP | 2001-152728 | 6/2001 |
| JP | 2002-227825 | 8/2002 |
| JP | 2003-56547 | 2/2003 |
| JP | 2003-172335 | 6/2003 |
| JP | 2004278659 A | * 10/2004 |
| KR | 2004087115 A | * 10/2004 |

OTHER PUBLICATIONS

Patent Abstracts of Japan 2003-172335 dated Jun. 20, 2003 (1 page).

Patent Abstracts of Japan 2002-227825 dated Aug. 14, 2002 (1 page).

Patent Abstracts of Japan 02-180321 dated Jul. 13, 1990 (1 page).

Patent Abstracts of Japan 2001-152728 dated Jun. 5, 2001 (1 page).

Patent Abstracts of Japan 2003-056547 dated Feb. 26, 2003 (1 page).

* cited by examiner (A)

(B)

(C)

(D)

(A)

(B)

(C)

(D)

HINGE DEVICE

TECHNICAL FIELD

This invention relates to a hinge device suited to be used for a portable equipment such a foldable portable telephone set and a notebook type personal computer, and more particularly to a hinge device usable for both right-hand and left-hand services.

BACKGROUND ART

In general, a hinge device of this type, as described in the under-listed Patent Document 1, includes a first and a second turnable members turnably connected to each other about a turning axis, and a biasing means for biasing one of the first and second turnable members toward the other. A pair of projection parts are formed on a confronting surface with the second turnable member of the first turnable member such that they are 180 degrees away from each other in a peripheral direction. A pair of engagement recesses are formed in a confronting surface with the first turnable member of the second turnable member such that they are 180 degrees away from each other in a peripheral direction. A first cam face is formed on one side part of each engagement recess in the peripheral direction of the second turnable member and a second cam face is formed on the other side part of each engagement recess in the peripheral direction of the second turnable member. The first cam surfaces of the pair of engagement recesses are arranged 180 degrees away from each other in the peripheral direction, and the second cam faces are also arranged 180 degrees away from each other in the peripheral direction. The first cam face and the second cam face formed on the same engagement recess are arranged a predetermined angle (for example, 20 degrees) away from each other in the peripheral direction. When the pair of projection parts are brought into abutment with the first cam faces respectively, biasing force of the biasing means is converted to a turn biasing force for turning the first turnable member in one direction with respect to the second turnable member. When the pair of projection parts are brought into abutment with the second cam faces respectively, biasing force of the biasing means is converted to a turn biasing force for turning the first turnable member in the other direction with respect to the second turnable member.

In the above hinge device, since the pair of projections, two first cam faces and two second cam faces are arranged 180 degrees away from each other and the first and second cam faces are arranged a predetermined angle (for example, 20 degrees) away from each other, they may be assembled such that when the first and second turnable members are turned to predetermined positions, the pair of projections are brought into abutment with the first cam faces respectively. They may also be assembled such that the pair of projections are brought into abutment with the second cam faces respectively. If the former device is referred to as a right-hand service hinge device, the latter device can be referred to as a left-hand service hinge device.

In case a hinge device having the above-mentioned construction is used, for example, in a foldable portable telephone set as one of portable equipments, two hinge devices having difference hand services are used as one set. One of the two hinge devices turnably connects one side parts in a direction of a turning axis of adjacent end parts of a transmission section and a reception section of a portable telephone set which are one and the other of a portable equipment to each other, and the other hinge device turnably connects the other side parts of the transmission section and the reception section. The first turnable member of each hinge device is non-turnably connected to a transmission section of the portable telephone set and the second turnable member is non-turnably connected to the reception section. Owing to this arrangement, the reception section is turnably connected to the transmission section through the hinge device. The turning range of the reception section is set between a folding position where the reception section is abutted with a front surface of the transmission section and a talking position where the reception section is turned from the folding position by a predetermined angle and abutted with a predetermined part of the transmission section.

When the reception section is turned to the folding position, the pair of projection parts of the right-hand service hinge device are brought into abutment with the first cam faces respectively and the pair of projections of the left-hand service hinge device are brought into abutment with the second cam faces respectively. In that condition, the biasing force of the biasing means of each of the left-hand and right-hand service hinge devices is converted to a turn biasing force for turning the reception section in a direction (one direction) toward the folding position from the talking position. This turn biasing force keeps the reception section in the folding position where the reception section is in abutment with the front surface of the transmission section. When the reception section is turned to the talking position, the pair of projection parts of the right-hand service hinge device are brought into abutment with the second cam faces respectively and the pair of projection parts of the left-hand service hinge device are brought into abutment with the first cam faces respectively. In that condition, the biasing force of the biasing means of each of the left-hand and right-hand service devices is converted to a turn biasing force for turning the reception section in a direction (the other direction) toward the talking position from the folding position. This turn biasing force keeps the reception section in the talking position where the reception section is in abutment with a predetermined position of the transmission section.

Patent Document 1: Japanese Patent Application Laid-Open No. 2001-152728

DISCLOSURE OF THE INVENTION

Problem to be Solved by the Invention

As mentioned above, in case the conventional hinge device is used as a portable telephone set, it is necessary to bring the reception section into abutment with a predetermined part of the transmission section when the reception section is located in the talking position. The reason is that when the reception section is located in the talking position, the first and second turnable members are turn biased in the other direction (in the direction toward the talking position from the folding position) and so, unless the reception section is brought into a stopping position where the reception section is in abutment with the transmission section, the reception section can not be stopped in the talking position. However, in case the reception section is brought into abutment with the transmission section in the talking position, if a large external force in a direction toward the talking position from the folding position acts on the reception section located in the talking position, the hinge device, the transmission section or reception section is liable to be damaged.

MEANS FOR SOLVING THE PROBLEM

The present invention has been accomplished in order to solve the above-mentioned problem. According to the present invention, there is provided a hinge device including a first and a second turnable members turnably connected to each other about a turning axis, and biasing means for biasing at least one of the first and second turnable members toward the other along the turning axis, one of the first and second turnable members being provided at a confronting surface thereof with a projection part projecting toward a confronting surface of the other turnable member and pressed against the confronting surface of the other turnable member by the biasing means, the other turnable member being provided at the confronting surface with a first, a second and a third recess formed on a circumference about the turning axis, the first recess being provided at a side part thereof located on the opposite side to the second recess with a first cam face which is abutted with the projection part to convert a biasing force of the biasing means to a turn biasing force in one direction about the turning axis, the second recess being provided at a side part thereof located on the opposite side to the first recess with a second cam face which is abutted with the projection part to convert the biasing force of the biasing means to a turn biasing force in the reverse direction, the third recess being provided at both side parts thereof in a peripheral direction of the confronting surface of the other turnable member with a pair of lock faces which are abutted with the both side parts of the projection part to prohibit the first and second turnable members from making a relative turn with force of a predetermined magnitude, the first and second cam faces being symmetrically arranged with respect to a straight line orthogonal to the turning axis and passing through a center in a peripheral direction between the pair of lock faces.

It is desirous that the first and second recesses are continuous with each other in the peripheral direction of the confronting surface of the other turnable member and constitute a single recess as a whole. However, the first and second recesses may be separately formed and arranged to be away from each other in the peripheral direction.

It is desirous that the hinge device further includes a first and a second hinge members turnably connected to each other about the turning axis, one of the first and second turnable members being connected to the first hinge member such that the turnable member is non-turnable but movable in a direction of the turning axis, the other turnable member being connected to the second hinge member such that the other turnable member is non-turnable and prohibited from moving away from the one turnable member beyond a predetermined position in the direction of the turning axis.

EFFECT OF THE INVENTION

According to the present invention having the above-mentioned construction, there can be obtained a hinge device for either the left-hand service or right-hand service by assembling such that a projection is turnable between the first cam face and the pair of lock faces, and there can also be obtained a hinge device for service of the other hand by assembling such that the projection is turnable between the second cam face and the pair of lock faces. In case the hinge device is assembled into a portable equipment such as, for example, a portable telephone set, the reception section can be stopped in the talking position with force of a predetermined magnitude by assembling such that when the reception section is located in the talking position, the projection is in abutment with the pair of lock faces. Accordingly, in case an overly external force is acted on the reception section in a direction toward the talking position from the folding position, the projection escapes from the third recess by climbing over the lock faces, thus allowing the reception section to make a further turn beyond the talking position. Thus, the hinge device can be prevented from being broken at its transmission section or reception section.

BRIEF DESCRIPTION OF DRAWINGS

FIG. 4(A) is a perspective view thereof, FIG. 4(B) is a front view thereof, FIG. 4(C) is a side view thereof, and FIG. 4(D) is a rear view thereof.

FIG. 5(A) is a perspective view thereof, FIG. 5(B) is a front view thereof, FIG. 5(C) is a side view thereof, and FIG. 5(D) is a rear view thereof.

DESCRIPTION OF REFERENCE NUMERAL

Figure 1:
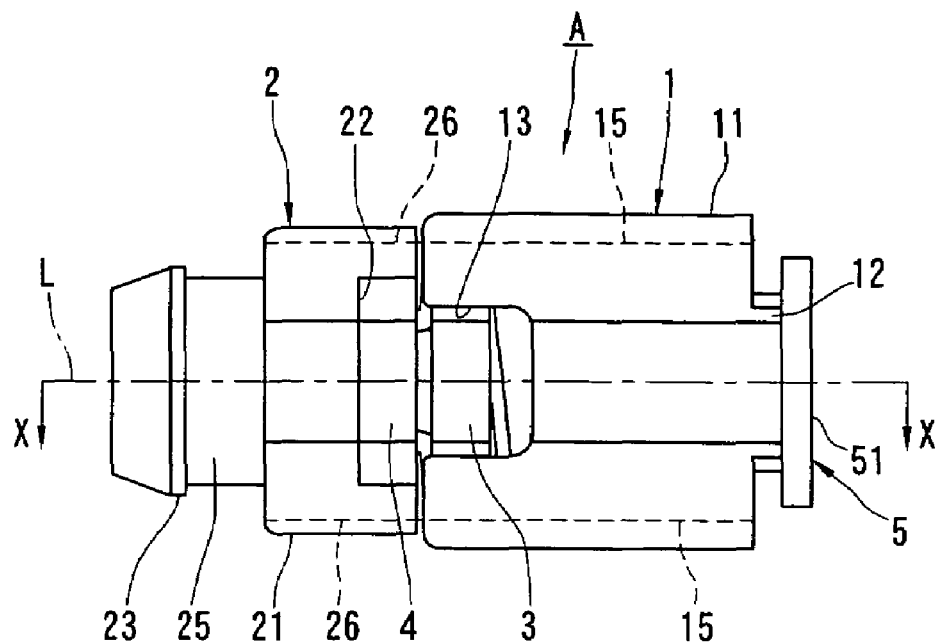
FIG. 1 is a front view showing one embodiment of the present invention.

A . . . hinge device
L . . . rotation axis
1 . . . first hinge member
2 . . . second hinge member
3 . . . first turnable member
4 . . . second turnable member
6 . . . coiled spring (biasing means)
32 . . . end face (confronting surface with the second turnable member of the first turnable member)
33 . . . projecting part
42 . . . end face (confronting surface with the first turnable member of the second turnable member)
43 . . . short recess (third recess)
43a . . . locking surface
43b . . . locking surface
44 . . . long recess (first and second recesses)
44a . . . inclination surface (first cam face)
44b . . . inclination surface (second cam face)

BEST MODE FOR CARRYING OUT THE INVENTION

The best mode for carrying out the present invention will be described hereinafter with reference to FIGS. 1 through 9 of the accompanying drawings.

Figure 2:
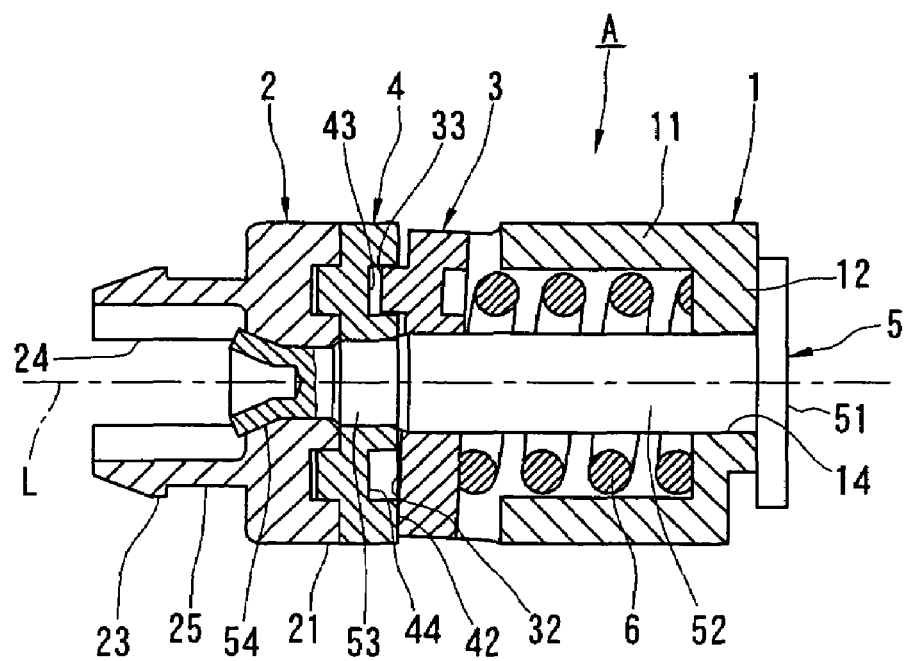
FIG. 2 is a sectional view taken on line X-X of FIG. 1.
Figure 3:
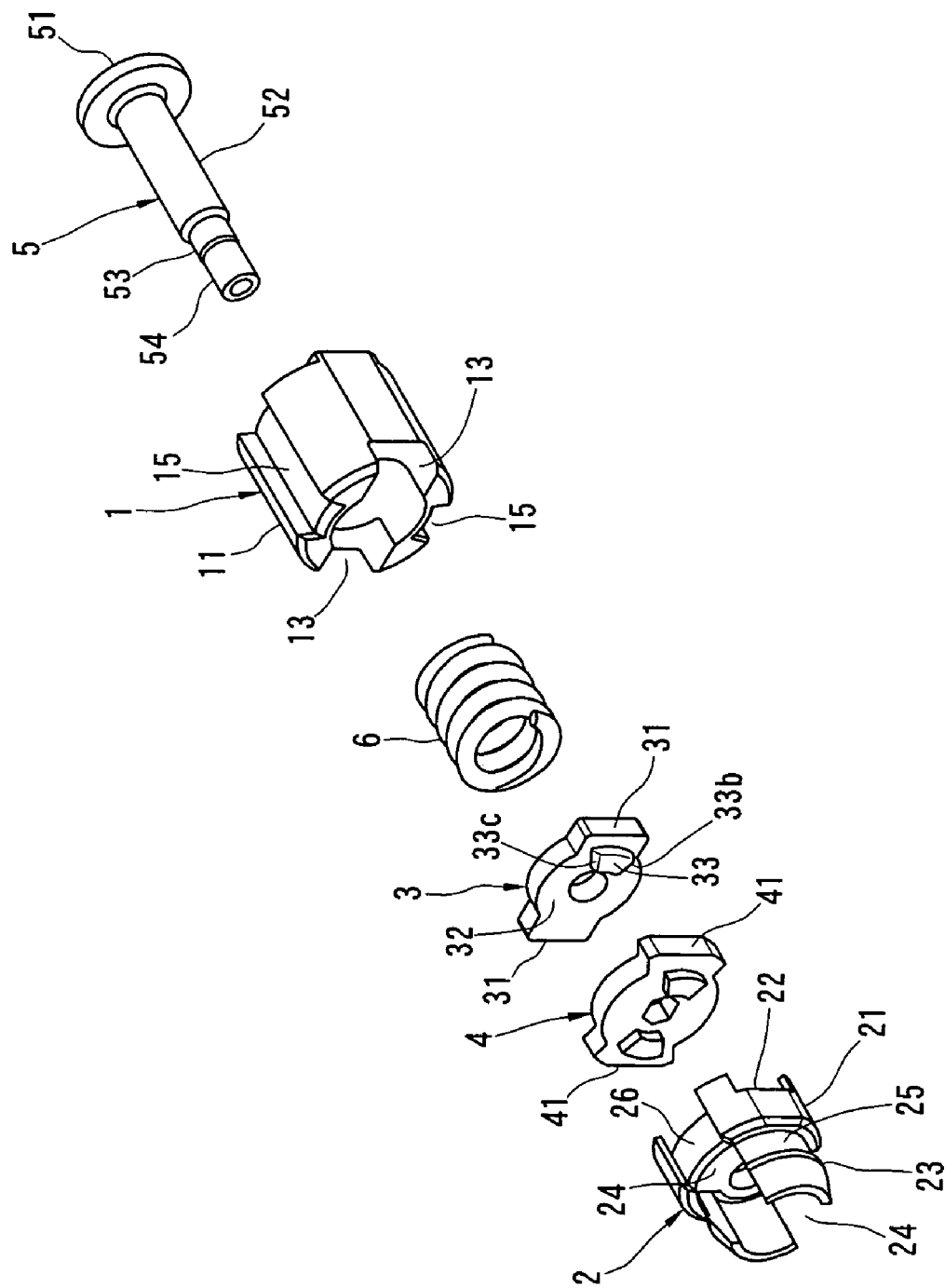
FIG. 3 is an exploded perspective view of the above embodiment.

FIGS. 1 through 9 show one embodiment of the present invention. A hinge device A of this embodiment comprises, as shown in FIGS. 1 through 3, a first hinge member 1, a second hinge member 2, a first turnable member 3, a second turnable member 4, a hinge shaft 5 and a coiled spring (biasing means) 6.

The first hinge member 1 includes a cylindrical part 11 having a circular configuration in section. One end of this cylindrical part 11 is open and the other end is closed by a bottom part 12. A pair of guide grooves 13, 13 extending toward the bottom part 12 along an axis (rotation axis) L of the cylindrical part 11 are formed in an end face on the opening side of the cylindrical part 11. The pair of guide grooves 13, 13 are arranged such that they are located 180 degrees away from each other in a peripheral direction of the cylindrical part 11. A through-hole 14 is formed in a central part of the bottom part 12. An axis of the through-hole 14 is aligned with the rotation axis L.

The second hinge member 2 includes a plate part 21 having a circular configuration in section. The plate part 21 is arranged in front of the cylindrical part 11 with its one end face (right end face in FIGS. 1 and 2) confronted with the end face on the opening side of the cylindrical part 11 and with its axis aligned with the axis L of the cylindrical part 11. A locking recess 22 is formed in one end face confronted with the first hinge member 1 of the second hinge member 2. An engaging cylindrical part 23 is integrally formed on the other end face of the second hinge member 2. The engaging cylindrical part 23 is provided with a pair of split grooves 24, 24 extending from its front end face to the plate part 21. Owing to a provision of the pair of split grooves 24, 24, the engaging cylindrical part 23 can be enlarged and reduced in diameter. An annular engaging recess 25 is formed in an outer peripheral surface of the engaging cylindrical part 23.

The first hinge member 1 and the second hinge member 2 are turnably connected to each other through the hinge shaft 5 about the axis L. That is, the hinge shaft 5 includes a disc-like head part 51, an enlarged-diameter shaft part 52 integrally attached to one end face of the head part 51, a reduced-diameter shaft part 53 integrally attached to a distal end face of the enlarged-diameter shaft part 52 and a stationary shaft part 54 integrally attached to a distal end face of the reduced-diameter shaft part 53. The head part 51, the enlarged-diameter shaft part 53, the reduced-diameter shaft part 53 and the stationary shaft part 54 are coaxially formed. The enlarged-diameter shaft part 52 is passed through the through-hole 14 of the first hinge member 1 such that the shaft part 52 is turnable about the axis L and movable in a direction of the axis L. After fitting to the central part of the plate part 21, the stationary shaft part 54 is caulked. By this, the second hinge member is fixed to the stationary shaft part 54. As a result, the first and second hinge members 1, 2 are turnably connected to each other about the axis L by the hinge shaft 5. Moreover, abutment of the head part 51 with the bottom part 12 of the first hinge member 1 prevents the first hinge member 1 from escaping from the hinge shaft 5 in a direction toward the first hinge member 1 from the second hinge member 2.

The first turnable member 3 and the second turnable member 4 are arranged between the first hinge member 1 and the second hinge member 2 in order from the first hinge member 1 toward the second hinge member 2. The first turnable member 3 has a disc-like configuration. The central part of the first turnable member 3 is passed through an end part on the reduced-diameter shaft part 53 side of the enlarged-diameter shaft part 52 of the hinge shaft 5 such that the first turnable member 3 is turnable and movable in the direction of the axis L. A pair of guide projections 31, 31 are arranged on an outer peripheral surface of the first turnable member 3 in such a manner as to be 180 degrees away from each other in the peripheral direction of the first turnable member 3. The respective guide projections 31, 31 are fitted to the corresponding guide grooves 13, 13 of the first hinge member 1 such that the guide projections 31, 31 are movable in the direction of the axis L but non-movable in the peripheral direction of the first hinge member 1. Owing to this arrangement, the first turnable member 3 is connected to the first hinge member 1 such that first turnable member 3 is non-turnable but movable in the direction of the axis L. Accordingly, The first turnable member 3 is turned about the axis L in unison with the first hinge member 1.

The second turnable member 4 has a disc-like configuration. The second turnable member 4 is received in a lock recess 22 of the second hinge member 2. One end face of the second turnable member 4 is located on almost the same plane as one end face confronting the first hinge member 1 of the second hinge member 2. A pair of lock projections 41, 41 are formed on the outer peripheral surface of the second turnable member 4. The respective lock projections 41, 41 are brought into engagement with the corresponding lock recesses 22, 22 in such a manner as to be non-turnable in the peripheral direction of the second hinge member 2, thereby non-turnably connecting the second turnable member 4 with the second hinge member 2. Although the second turnable member 4 is movably received in the lock recess 22 in the direction of the axis L, the member 4 is not moved in the direction of the axis L substantially with respect to the second hinge member 2 after assembly of the entire hinge device A as described hereinafter. Accordingly, the second turnable member 4 is turned about the axis L in unison with the second hinge member 1. Thus, the second turnable member 4 may be formed integrally with the second hinge member 2.

A coiled spring 6 is received in an annular space between the inner peripheral surface of the cylindrical part 11 of the first hinge member 1 and the outer peripheral surface of the enlarged-diameter part 52 of the hinge shaft 5 such that the coiled spring 6 is compressed in the axial direction. One end of this coiled spring 6 is abutted with the bottom part 12 of the hinge member 1 and the other end is abutted with the first turnable member 3. The coiled spring 6 urges the first turnable member 3 against the second turnable member 4. As a result, the second turnable member 4 is urged against the second hinge member 2, thereby preventing the second turnable member 4 from moving from the first turnable member 3 toward the second turnable member 4.

Figure 4:
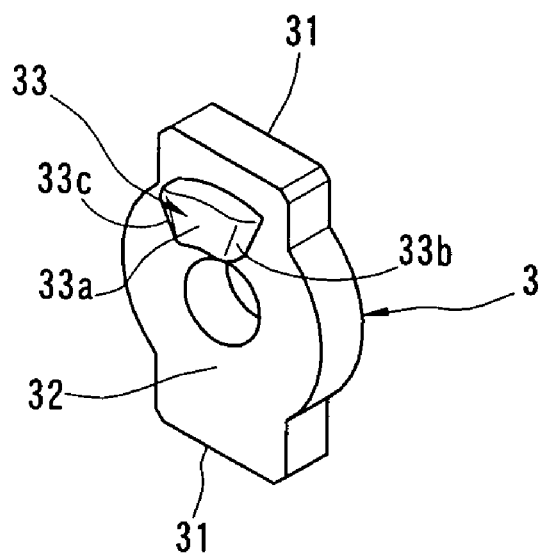
FIG. 4 is a view showing a first turnable member used in the above embodiment.
Figure 4:
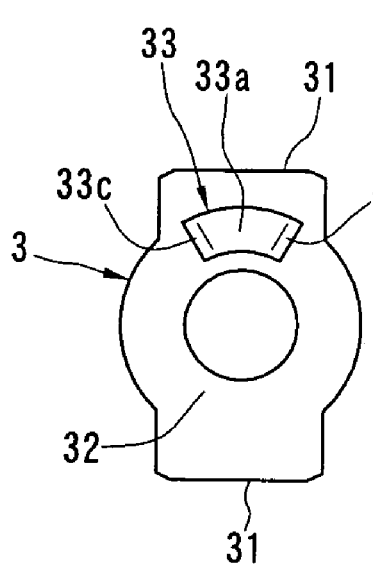
Figure 4:
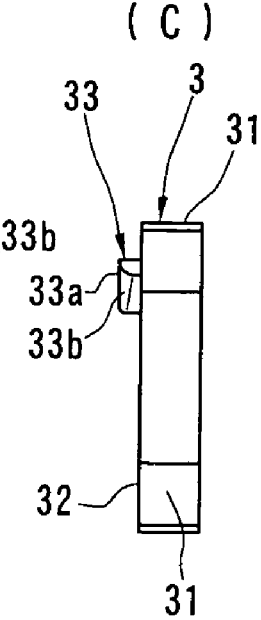
Figure 4:
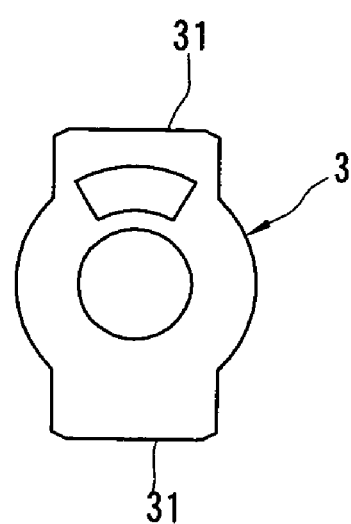
Figure 6:
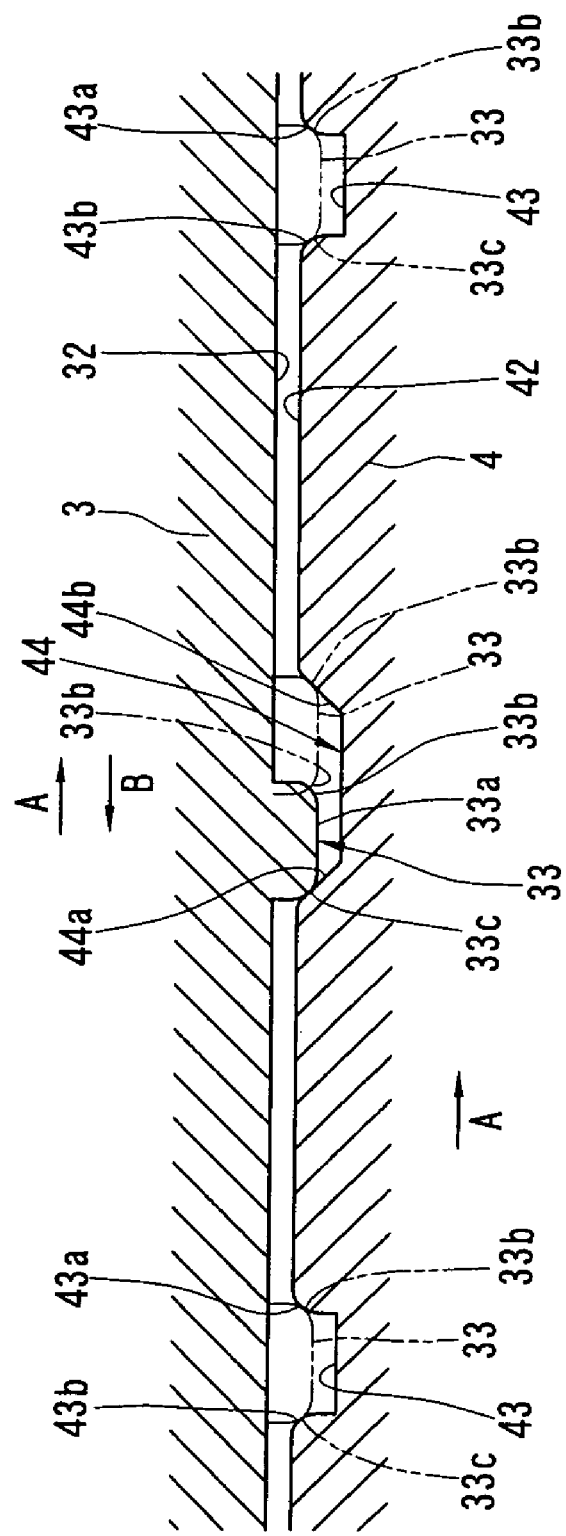
FIG. 6 is a development view showing a relation between the first turnable member and the second turnable member of a hinge device according to the present invention.

As shown in FIGS. 2 through 4, an end face (confronting surface) 32 confronting the second turnable member 4 of the first turnable member 3 is formed as a plane orthogonal to the axis L. A projection part 33 is formed on this end face 32. This projection part 33 is arranged on a circumference about the axis L and extends along the circumference. A distal end face 33a of the projection part 33 is formed as a plane orthogonal to the axis L. The distal end face 33a is press contacted with an end face (confronting surface) 42 confronting the first turnable member 3 of the second turnable member 4 by the biasing force of the coiled spring 6. As shown in FIGS. 4 and 6, the projection part 33 is provided at both end parts (both end parts in the peripheral direction of the first turnable member 33, i.e., peripheral direction about the axis L) thereof with abutment surfaces 33b, 33c, respectively, which are each formed of an arcuate surface or other convexly curved surfaces. The abutment surfaces 33b, 33c have a same configuration and a same size dimension. Moreover, the abutment surfaces 33b, 33c are symmetrically arranged with respect to a line passing through a center between the abutment surfaces 33b, 33c and orthogonal to the axis L. One end part of each of the abutment surfaces 33b, 33c is smoothly continuous with the distal end face 33a. That is, the distal end face 33a serves as a contact plane of the abutment surfaces 33b, 33c.

Figure 5:
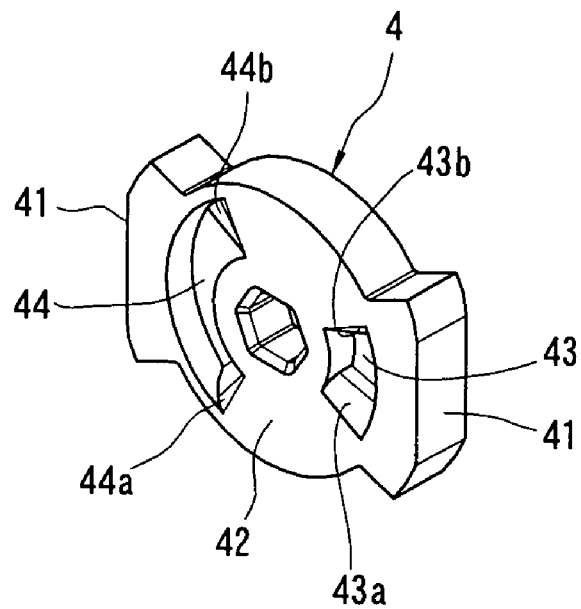
FIG. 5 is a view showing a second turnable member used in the above embodiment.
Figure 5:
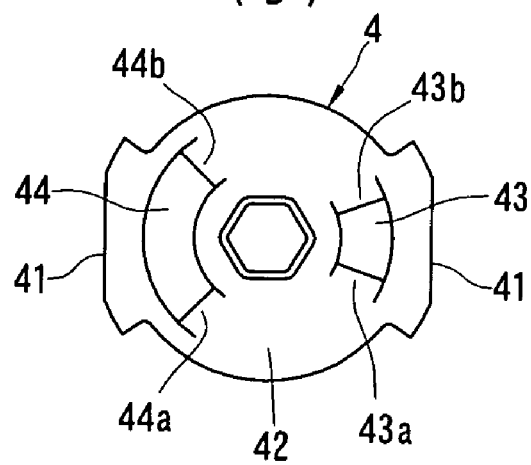
Figure 5:
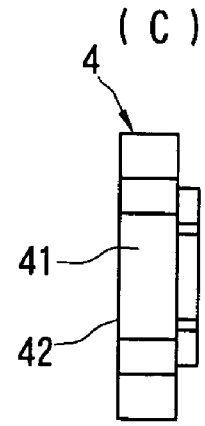
Figure 5:
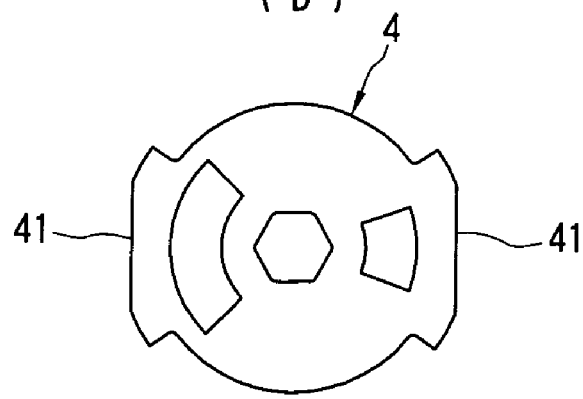

As shown in FIGS. 2 and 5, the end face 42 confronting the first turnable member 3 of the second turnable member 4 is formed as a plane orthogonal to the axis L. A short recess (third recess) 43 and a long recess (first recess and second recess) 44 are formed in this end face 42. The short recess 43 and the long recess 44 are arranged on a same circumference as a circumference on which the projection part 33 is arranged and extend along the circumference. Moreover, the short recess 43 and the long recess 44 are arranged such that their centers in the peripheral direction are located 180 degrees away from each other in the peripheral direction.

The short recess 43 has a width (width in the radial direction of the second turnable member 4) equal to or longer than that of the projection portion 33. However, its length in the peripheral direction is set to be generally equal to or slightly shorter than that of the projection part 33. The short recess 43 is provided at its both ends with lock faces 43a, 43b each composed of a convexly curved surface such as an arcuate surface. The lock faces 43a, 43b have a same configuration and a same size dimension. Moreover, as indicated by an imaginary line in FIG. 6, when the first and second turnable members 3, 4 are positioned (those positions of the first and second turnable members 3, 4 are hereinafter referred to as the "locking positions") such that when the center in the peripheral direction between the lock faces 43a, 43b about the axis L is aligned with the center in the peripheral direction between the abutment surfaces 33b, 33c, the intermediate parts of the lock faces 43a, 43b are brought into abutment with the intermediate parts of the corresponding abutment surfaces 33b, 33c, respectively. In the condition wherein the lock faces 43a, 43b are in abutment with the abutment surfaces 33b, 33c respectively, the relative turn made by the first and second turnable members 3, 4 is prohibited with force of a predetermined magnitude by the biasing force of the coiled spring 6.

The length of the long recess 44 in the peripheral direction about the axis L is set to be longer than the length in the same direction of the projection part 33. The width of the long recess 44 is set to be equal to or longer than the width of the projection part 33. Accordingly, the projection part 33 can be entered into the long recess 44. Inclination surfaces (cam faces) 44a, 44b, which are sloped downward toward the bottom surface of the long recess 44, are formed on both end parts in the peripheral direction of the long recess 44. The inclination surfaces 44a, 44b have a same configuration and a same size dimension except that their inclining directions are reversed. Moreover, the inclination surfaces 44a, 44b are symmetrically arranged with respect to a line passing through the center (center between the abutment surfaces 33b, 33c in the peripheral direction about the axis L) of the short recess 43 in the peripheral direction of the second turnable member 4 and orthogonal to the axis L.

Since the inclination surfaces 44a, 44b are such arranged as mentioned above, when the first turnable member 3 is relatively turned in one direction (in the direction indicated by an arrow A in FIG. 6) by a predetermined opening/closing angle (for example, about 160 degrees) from the locking position with respect to the second turnable member 4, the abutment surface 33c of the projection part 33 is, as indicated by a solid line in FIG. 6, brought into abutment with the inclination surface 44a of the long recess 44. Then, the biasing force of the coiled spring 6 is converted to a turn biasing force by the abutment surface 33c and the inclination surface 44a. By this turn biasing force, the first turnable member 3 is turn biased in one direction (direction indicated by the arrow A) with respect to the second turnable member 4. On the other hand, when the first turnable member 3 is relatively turned in the other direction (direction indicated by an arrow B in FIG. 6) from the locking position by the opening/closing angle with respect to the second turnable member 4, the abutment surface 33b is, as indicated by an imaginary line in FIG. 6, brought into abutment with the inclination surface 44b. Then, the biasing force of the coiled spring 6 is converted to a turn biasing force by the abutment surface 33b and the inclination surface 44b. By this turn biasing force, the first turnable member 3 is turn biased in the other direction (direction as indicated by the arrow B) with respect to the second turnable member 4.

Figure 7:
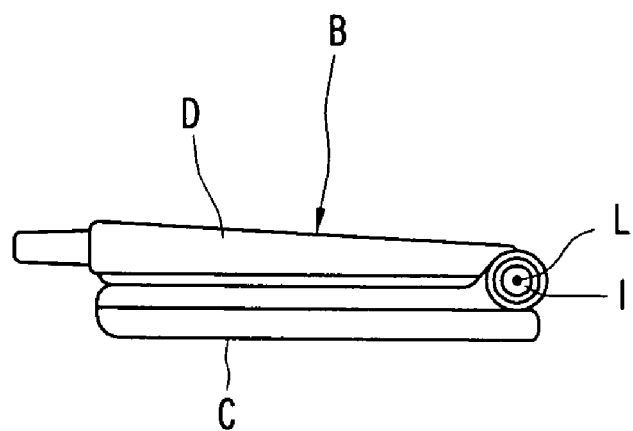
FIG. 7 is a side view showing one example of a cellular telephone set having two hinge devices according to the present invention used as one set, in which a reception section is turned into a folding position.
Figure 8:
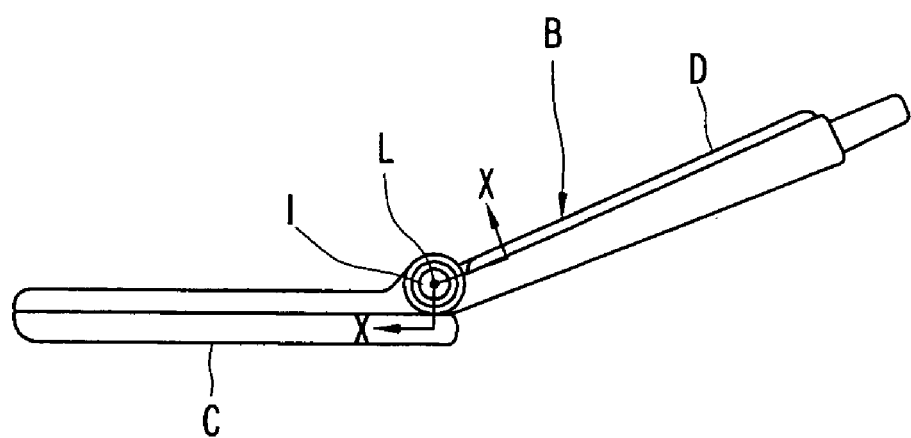
FIG. 8 is a side view showing one example of the above cellular telephone set but in which a reception section is turned into a talking position.

FIGS. 7 and 8 show a portable telephone set (portable equipment) B in which the above hinge device A is used. The portable telephone set B includes a transmission section C and a reception section D as one pair of members which are turnably connected to each other in the portable equipment. The transmission section C and the reception section D are turnably connected to each other through one set of hinge devices A, A. The turning range of the transmission section C and the reception section D is restricted between a folding position shown in FIG. 7 and a talking position shown in FIG. 8.

Figure 9:
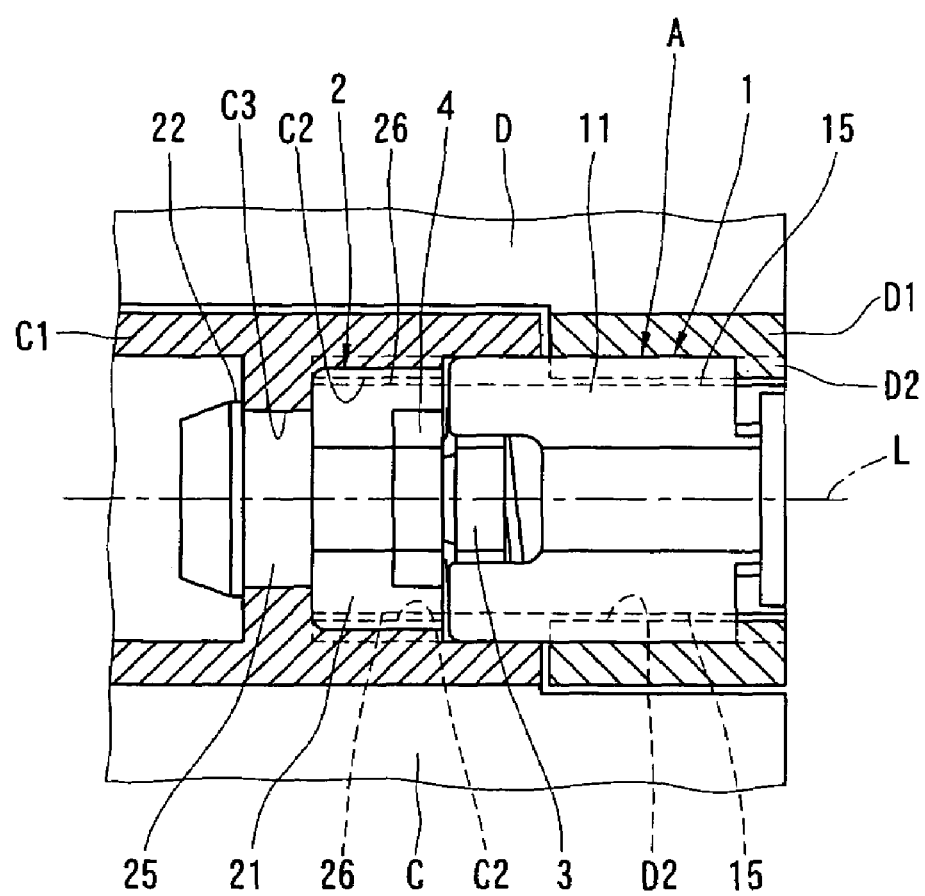
FIG. 9 is an enlarged vertical sectional view taken on line X-X of FIG. 8.

That is, as shown in FIG. 9, two connecting cylindrical parts C1 (only one connecting cylindrical part C1 is shown) are formed on one end part on the reception section D side of the transmission section C. The two connecting cylindrical parts C1 are located away from each other in the left and right direction (direction of the axis L). They are arranged such that their axes are aligned to each other and in the left and right direction. The second hinge member 2 is fitted to the connecting cylindrical part C1. The connecting cylindrical part C1 has a key part C2 and an annular projection part C3 which are formed on its inner peripheral surface. By bringing the key part C2 into engagement with a key groove 26 formed in an outer peripheral surface of the second hinge member 2, the second hinge member 2 is non-turnably connected to the transmission section C. Moreover, by bringing the annular projection part C3 into engagement with the engagement recess 25, the second hinge member 2 is non-movably connected to the transmission section C in the direction of the axis L. The annular projection part C3 can be brought into engagement with the engagement recess 25 by inserting the engagement cylindrical part 23 through an outer opening part of the connecting cylindrical part C1 while reducing the engagement cylindrical part 23 in diameter.

Two connecting cylindrical parts D1 (only one connecting cylindrical part is shown) is formed on one end part on the transmission section C side of the reception section D. The two connecting cylindrical parts D1 are adjacently arranged on the outer side of the two connecting cylindrical parts C1 with almost no gap formed between the connecting cylindrical part D1 and the connecting cylindrical part C1. The cylindrical part 11 of the first hinge member 1 is fitted to the connecting cylindrical part D1. A key part D2 is formed on an inner peripheral surface of the connecting cylindrical part D1 and this key part D2 is fitted to a key groove 15 formed in the outer peripheral surface of the first hinge member 1. Owing to the foregoing arrangement, the first hinge member 1 is non-turnably connected to the reception section D. An end part on the second hinge member 2 side of the cylindrical part 11 is passed through the connecting cylindrical part D1 and turnably fitted to the connecting cylindrical part C1. Owing to this arrangement, the transmission section C and the reception section D are turnably connected to each other about the axis L. The key part C2 formed on an inner peripheral surface of the connecting cylindrical part C1 is not extended to the end part of the cylindrical part C1 to which the cylindrical part 11 is fitted and therefore, the key part C2 does not prohibit the cylindrical part 11 from turning.

The transmission section C and the reception section D can be assembled to each other, for example, in the following manner. First, the transmission section C and the reception section D are brought to the talking position. The axes of the connecting cylindrical parts C1, C2 are preliminarily aligned. With respect to the hinge devices A, A, the first and second turnable members 3, 4 are brought to the locking position by properly relatively turning the first and second hinge members 1, 2. That is, the abutment surfaces 33b, 33c of the projection part 33 are press contacted with the lock faces 43a, 43b of the short recess 43, respectively. Then, each hinge device A is sequentially inserted into the connecting cylindrical parts D1, C1 through the outer opening part of the connecting cylindrical part D1 with the engagement cylindrical part 23 first. At that time, when the transmission section C and the reception section D are brought to the talking position and the first and second turnable members 3, 4 of each hinge device A are brought to the locking position, the key parts C2, D2 of the connecting cylindrical parts C1, D1 are linearly arranged and the key grooves 15, 26 of the first and second hinge members 2, 3 are linearly arranged. Accordingly, by positionally aligning the key grooves 15, 26 of each hinge device A with the key parts C2, D2 of the connecting cylindrical parts C1, D1, the first and second hinge members 1, 2 can easily be inserted into the connecting cylindrical parts D1, C1. Thereafter, the annular projection part C3 is fitted to the engagement recess 25, thereby completing assembly of the transmission section C and the reception section D.

Presume that in the portable telephone set B having the above-mentioned construction, the transmission section C and the reception section D are located in the talking position. In that condition, the first and second turnable members 3, 4 of the two hinge devices A are located in the locking position and as shown in FIG. 6, the abutment surfaces 33b, 33c of each hinge device A are press contacted with the lock faces 43a, 43b respectively (see the left and right projection parts 33 and the short recesses 43 in FIG. 6). Owing to this arrangement, the reception section D is prohibited from turning with force of a predetermined magnitude. Accordingly, the reception section D can turn in a direction (this direction is hereinafter referred to as the "opening direction" and the reverse direction is as the "closing direction") toward the talking position from the folding position beyond the talking position. In case an overly external force acts on the reception section D located in the talking position in the opening direction, the reception section D is turned beyond the talking position. Thus, the transmission section C, the reception section D or the hinge device A can be prevented from being broken by an external force.

When the reception section D is pushed toward the folding position with force exceeding the predetermined magnitude, the reception section D is turned toward the folding position against the turn biasing force generated from the coiled spring 6. At that time, in one hinge device (this hinge device is hereinafter referred to as the left-hand service hinge device") A, the abutment surface 33b climbs over the lock face 43a (see the projection part 33 and the short recess 43 shown in FIG. 6) in accordance with turn of the reception section D. In the other hinge device (this hinge device is hereinafter referred to as the "right-hand service hinge device") A, the abutment surface 33c climbs over the lock face 43b (see the projection part 33 and the short recess 43 shown on the right side in FIG. 6) in accordance with turn of the reception section D. Thereafter, the distal end face 33a of the projection part 33 is slidingly moved on the end face 42 of the second turnable member 4, while the reception section D is turned from the talking position to the folding position. The reception section D can be stopped in any optional position between the talking position and the folding position by friction resistance between the distal end face 33a and the end face 42.

When the reception section D is turned to a position located, for example, about 10 degrees on this side of the folding position, the abutment surface 33c of the left-hand service hinge device A starts contacting the inclination surface 44a (see the projection part 33 and the long recess 44 indicated by a solid line in FIG. 6). At the same time, the abutment surface 33b of the right-hand service hinge device A starts contacting the inclination surface 44b (see the projection part 33 and the long recess 44 indicated by an imaginary line in FIG. 6). As a result, in the left-service hinge device A, the first turnable member 3 is turn biased in a direction as indicated by an arrow A of FIG. 6 by the turn biasing force based on the biasing force of the coiled spring 6 with respect to the second turnable member 4, while in the right-hand service hinge device A, the first turnable member 3 is biased in a direction as indicated by an arrow B of FIG. 6 by the turn biasing force based on the biasing force of the coiled spring 6 with respect to the second turnable member 4. The turn biasing force in the arrow A direction in the left-hand service hinge device A and the turn biasing force in the arrow B direction in the right-hand service hinge device A act on the reception section D in the same direction. That is, they act in a direction toward the folding position from the talking position. Then, the reception section D is turn biased in a direction toward the folding position from the talking position by the turn biasing force of the respective hinge devices A, A with respect to the transmission section C. When the reception section D is turned to the folding position where the reception section D is in abutment with the transmission section C, the reception section D becomes unable to turn any further and held in the folding position by the turn biasing force generated from the coiled spring 6.

The reception section D located in the folding position can be turned toward the talking position against the turn biasing force generated from the coiled spring 6. When the reception section D is turned to a position, for example, about 10 degrees on this side of the talking position, the abutment surface 33b of the left-hand service hinge device A starts contacting the lock face 43a and the abutment surface 33c of the right-hand service hinge device A starts contacting the lock face 43b. Then, the turn biasing force of the coiled spring 6 is converted to a turn biasing force. By this turn biasing force, the reception section D is turn biased toward the talking position from the folding position. When the reception section D reaches the talking position, the abutment surfaces 33b, 33c are contacted with the lock faces 43a, 43b of the short recess 43 in any of the left-hand and light-hand service hinge devices A, A. By this, the first and second turnable members 3, 4 are prohibited from making a relative turn with force of a predetermined magnitude and thus, the reception section D is positionally fixed at the talking position with force of a predetermined magnitude.

As described above, in the hinge device A according to the present invention, the hinge devices A assembled in an entirely same manner can be used as left-hand or right-hand service hinge devices. Moreover, the abutment surfaces 33*b*, 33*c* as the both end parts of the projection part 33 are press contacted with the lock faces 43*a*, 43*b* as the both end parts of the short recess 43. By this, since the first and second turnable members 3, 4 and thus, the transmission section C and the reception section D of a portable telephone set are prohibited from relatively turned with force of a predetermined magnitude, the reception section D is allowed to turn when a larger external force acts on the reception section D. Accordingly, the transmission section C, the reception section D or the hinge device A is prevented from being damaged.

It should be noted here that the present invention is not limited to the above-mentioned embodiment but that many changes and modifications can be made in accordance with necessity without departing from the gist of the invention.

For example, in the above-mentioned embodiment, the abutment surfaces 33*b*, 33*c* and the lock faces 43*a*, 43*b* are constituted by a convexly curved surface. However, it is also accepted that they may be constituted by a planar inclination surface. Although the inclination surfaces 43*a*, 43*b* formed of a plane are employed as the cam faces, a convexly curved surface like that of the lock faces 44*a*, 44*b* may be used instead of the planar inclination surfaces 44*a*, 44*b*.

Moreover, in the above-mentioned embodiment, the inclination surfaces 44*a*, 44*b* are formed on the both end parts of the long recess 44.

However, it is also accepted that the long recess 44 is divided into two in the peripheral direction of the second turnable member 4, the inclination surface 44*a* is formed on an end part on the short recess of one recess 43 side and the inclination surface 44*b* is formed on an end part on the short recess 43 side of the other recess.

INDUSTRIAL APPLICABILITY

A hinge device according to the present invention can be used for a portable equipment such as a portable telephone set and a notebook type personal computer.

The invention claimed is:

1. A hinge device comprising:
a first hinge member and a second hinge member rotatably connected to each other about a turning axis,
a first movable member mounted non-turnably about the turning axis with respect to the first hinge member but movably in a direction of the turning axis on an end part of the first hinge member facing the second hinge member,
a second movable member supported non-turnably about the turning axis with respect to the second hinge member at an end part of the second hinge member facing the first hinge member, and
biasing means for biasing at least one of said first and second movable members toward the other along said turning axis,
wherein one of said first and second movable members is provided at a confronting surface thereof with a projection part projecting toward a confronting surface of the other movable member and is pressed against the confronting surface of the other movable member by said biasing means,
wherein the other movable member being is provided at the confronting surface with a long recess and a short recess,
wherein the short recess is shorter than said long recess in length in a peripheral direction formed on a circumference about said turning axis,
wherein said long recess is provided at one end part thereof in the peripheral direction with a first cam face that, when abutted with said projection part, converts a biasing force of said biasing means to a turn biasing force in one direction about said turning axis,
wherein said long recess is provided at the other end part thereof with a second cam face that, when abutted with said projection part, converts the biasing force of said biasing means to a turn biasing force in a direction opposite to the one direction,
wherein said short recess is provided at both end parts thereof in a peripheral direction of the confronting surface of the other movable member with a pair of lock faces which are abutted with both side parts of said projection part to prohibit said first and second movable members from making a relative turn with force of a predetermined magnitude, and
wherein said first and second cam faces being symmetrically arranged with respect to a straight line orthogonal to said turning axis and passing through a center in a peripheral direction between said pair of lock faces.

* * * * *